(12) United States Patent
Nakai et al.

(10) Patent No.: US 6,803,149 B2
(45) Date of Patent: Oct. 12, 2004

(54) NON-AQUEOUS ELECTROLYTIC SOLUTION SECONDARY BATTERY

(75) Inventors: Kenji Nakai, Fukaya (JP); Yoshimasa Koishikawa, Honjou (JP); Youshin Yagi, Osato-gun (JP); Kensuke Hironaka, Fukaya (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 407 days.

(21) Appl. No.: 09/977,214

(22) Filed: Oct. 16, 2001

(65) Prior Publication Data

US 2002/0102460 A1 Aug. 1, 2002

(30) Foreign Application Priority Data

Dec. 4, 2000 (JP) ........................................ 2000-368725
Feb. 7, 2001 (JP) ........................................ 2001-030357

(51) Int. Cl.[7] ............................ H01M 4/50; H01M 4/58
(52) U.S. Cl. ................ 429/224; 429/231.8; 429/231.95
(58) Field of Search .............................. 429/224, 231.8, 429/231.95, 53

(56) References Cited

U.S. PATENT DOCUMENTS

| 5,962,166 A | * 10/1999 | Ein-Eli et al. ............... 429/224 |
| 5,962,167 A | * 10/1999 | Nakai et al. ............. 429/231.1 |
| 6,019,802 A | * 2/2000 | Ishizuka et al. ........... 29/623.5 |
| 6,506,518 B1 | * 1/2003 | Kobayashi et al. ....... 429/231.1 |

FOREIGN PATENT DOCUMENTS

| JP | 10-241685 | * 9/1998 | ............ H01M/4/58 |
| JP | A 10-321225 | 12/1998 | |
| JP | A 11-176441 | 7/1999 | |
| JP | A 2001-15173 | 1/2001 | |
| JP | 2001-015173 | * 1/2001 | .......... H01M/10/40 |

* cited by examiner

Primary Examiner—Patrick Ryan
Assistant Examiner—Julian Mercado
(74) Attorney, Agent, or Firm—Oliff & Berridge, PLC (57) ABSTRACT

The present invention is to provide a non-aqueous electrolytic solution secondary battery which has high safety while maintaining high capacity and high power. A cylindrical lithium-ion battery 20 is provided in a battery lid which is a portion of a battery container with a cleavage valve 11 which cleaves at a predetermined pressure, and includes an electrode winding group 6 prepared by winding a positive electrode, a negative electrode and a separator, connection portions for connecting the electrode winding group 6 to respective electrode terminals, and non-aqueous electrolytic solution therein. As a positive electrode active material, lithium manganate where the amount of elution of manganese into the non-aqueous electrolytic solution is 5% or less based on the lithium manganate in a region where an electrode potential to metal lithium is 4.8V or more is used. As a negative electrode active material, graphite in/from which lithium ions can be occluded/released according to charging and discharging is used.

20 Claims, 1 Drawing Sheet

Fig. 1

NON-AQUEOUS ELECTROLYTIC SOLUTION SECONDARY BATTERY

FIELD OF THE INVENTION

The present invention relates to a non-aqueous electrolytic solution secondary battery, and in particular relates to a non-aqueous electrolytic solution secondary battery where an electrode group having a positive electrode, a negative electrode and a separator, connecting portions which connect to respective terminals from the electrode group, and a non-aqueous electrolytic solution are accommodated in a battery container provided with an internal pressure releasing mechanism which releases internal pressure at a predetermined pressure and where the positive electrode is constituted by applying a positive electrode active material mixture including lithium-manganese complex oxide and conductive material on both surfaces of a foil-shaped positive electrode collector, and the negative electrode is constituted by applying a negative electrode active material mixture including carbon material on both surfaces of a foil-shaped negative electrode collector.

DESCRIPTION OF THE RELATED ART

Because a non-aqueous electrolytic solution secondary battery represented by a lithium-ion secondary battery has a high energy density as its merit, it is mainly used as a power source or power supply for portable equipment such as a VTR camera, a notebook type personal computer, a portable or cellar telephone or the like. The interior structure of this battery is generally of a winding type as described below. Each of a positive electrode and a negative electrode of the battery is formed in a strip-shape where active material is applied to a metal foil, and a winding group is spirally formed by winding the positive electrode and the negative electrode through a separator so as not to come in direct contact with each other. This winding group is accommodated in a cylindrical battery container or can, and, after the battery container is filled with electrolytic solution, it is sealed.

An ordinary cylindrical lithium-ion secondary battery has an external dimension of a diameter of 18 mm and a height of 65 mm, which is called 18650 type, and it is widely spread as a small-sized non-aqueous electrolytic solution secondary battery for a civilian use. Lithium cobaltate having a high capacity and a long life is mainly used as a positive electrode active material for the 18650 type lithium-ion secondary battery, and battery capacity of the 18650 type lithium-ion secondary battery is approximately 1.3 Ah to 1.7 Ah and battery power (output) is about 10 W or so.

Meanwhile, in order to cope with the environmental problems in the automotive industry, development of electric vehicle (EVs) whose power sources are confined completely to batteries so that there is no gas exhausting and development of hybrid electric vehicles (HEVs) where both internal combustion engines and batteries are used as their power sources have been facilitated and some of them have reached a practical state. Such a battery which is a power source for EV or HEV is required to have high power and high energy characteristics, and an attention is being paid to a lithium-ion battery as a battery which meets such requirements.

In order to spread these EVs and HEVs, it is essential to reduce the cost of such a battery. For this reason, it is required to use low-cost battery materials, where, in a case of a positive electrode active material, for example, a special attention is being paid to manganese oxides which are rich as natural resources and improvement of such batteries has been conducted for high performance thereof. Also, as the batteries for the EVs and HEVs, not only high capacity but also high power which affects acceleration of a vehicle, namely reduction of the internal resistance of the battery, are required. In order to increase the reaction area of the electrode, this requirement can be met by utilizing a lithium manganate having a large specific surface area as the positive electrode active material.

However, in a case of the lithium-ion battery, according to an increase in capacity and power, the safety is apt to lower. Particularly, as mentioned above, in the case that lithium manganate aiming at high power is used, such a tendency appears that a phenomenon of the battery becomes violent when it falls in an abnormal state. In a battery having high capacity and high power such as used for a power source for EV or HEV, since large current charging and large current discharging are performed, it is substantially difficult to provide within the battery a current shutting-off mechanism (a kind of a cutting-off switch) which actuates according to an increase in internal pressure at an abnormal time, such as employed in the 18650 type lithium-ion battery.

Also, in a case in which a large-sized non-aqueous electrolytic solution secondary battery is used as, for example, a power source for EV or HEV, safety must always be secured even at an abnormal time such as (1) at a time of overcharging due to failure in a charging control system, (2) at a time of crushing due to an accidental collision, (3) at a time of foreign matter spitting, (4) at a time of external short-circuiting or the like. That is, it is an important problem that behavior of the battery, when it has fallen into an abnormal state (at the abnormal time), does not injure a person or passenger and damage to a vehicle is suppressed to a minimum.

SUMMARY OF THE INVENTION

In view of the above circumstances, a first object of the present invention is to provide a non-aqueous electrolytic solution secondary battery which has high safety while maintaining high capacity and high power. Also, a second object of the present invention is to provide a non-aqueous electrolytic solution secondary battery which can secure safety even at an abnormal time of the battery.

In order to achieve the first object, according to a first aspect of the present invention, there is provided a non-aqueous electrolytic solution secondary battery where an electrode group having a positive electrode, a negative electrode and a separator, connecting portions which connect to respective terminals from the electrode group, and a non-aqueous electrolytic solution are accommodated in a battery container provided with an internal pressure releasing mechanism which releases internal pressure at a predetermined pressure and where the positive electrode is constituted by applying a positive electrode active material mixture including lithium-manganese complex oxide and conductive material on both surfaces of a foil-shaped positive electrode collector, and the negative electrode is constituted by applying a negative electrode active material mixture including carbon material on both surfaces of a foil-shaped negative electrode collector, wherein the lithium-manganese complex oxide is set such that an amount of elution of manganese into the non-aqueous electrolytic solution is 5% or less on the basis of the lithium-manganese complex oxide in a range where an electrode potential to metal lithium is 4.8 V or more, and the carbon material is graphite in/from which lithium ions can be occluded/released according to charging/discharging.

Also, in order to the first object, according to a second aspect of the present invention, there is provided a non-aqueous electrolytic solution secondary battery where an electrode group having a positive electrode, a negative electrode and a separator, connecting portions which connect to respective terminals from the electrode group, and a non-aqueous electrolytic solution are accommodated in a battery container provided with an internal pressure releasing mechanism which releases internal pressure at a predetermined pressure and where the positive electrode is constituted by applying a positive electrode active material mixture including lithium-manganese complex oxide and conductive material on both surfaces of a foil-shaped positive electrode collector, and the negative electrode is constituted by applying a negative electrode active material mixture including carbon material on both surfaces of a foil-shaped negative electrode collector, wherein the lithium-manganese complex oxide is set such that an amount of elution of manganese into the non-aqueous electrolytic solution is 7% or less on the basis of the lithium-manganese complex oxide in a range where an electrode potential to metal lithium is 4.8V or more, and the carbon material is amorphous carbon in/from which lithium ions can be occluded/released according to charging/discharging.

In the present invention, in order to secure a non-aqueous electrolytic solution secondary battery having high capacity and high power (output), the lithium-manganese complex oxide is used as the active electrode active material and the carbon material is used as the negative electrode active material. In the non-aqueous electrolytic solution secondary battery with high capacity and high power, when it has fallen into an abnormal state, large current charging or large current discharging is maintained and a large amount of gas is generated urgently due to chemical reaction between the non-aqueous electrolytic solution and the active material mixture within a battery container so that internal pressure in the battery container is increased. This tendency is calmer in the lithium-manganese complex oxide than a cobalt-manganese complex oxide or a nickel-manganese complex oxide. In general, in a non-aqueous electrolytic solution secondary battery, in order to prevent the internal pressure in a battery container from increasing, an internal pressure releasing mechanism for releasing the internal pressure at a predetermined pressure is provided in the battery container. In the above aspects of the present invention, however, such a configuration that the lithium-manganese complex oxide which is set such that an amount of elution of manganese into the non-aqueous electrolytic solution is 5% or less on the basis of the lithium-manganese complex oxide in a range where an electrode potential to metal lithium is 4.8V or more is used as the positive electrode active material and that the carbon material which is graphite in/from which lithium ions can be occluded/released according to charging/discharging is used as the negative electrode active material, or such a configuration that the lithium-manganese complex oxide which is set such that an amount of elution of manganese into the non-aqueous electrolytic solution is 7% or less on the basis of the lithium-manganese complex oxide in a range where an electrode potential to metal lithium is 4.8V or more is used as the positive electrode active material and that the carbon material is amorphous carbon in/from which lithium ions can be occluded/released according to charging/discharging is used as the negative electrode active material is employed, gas discharging form the internal pressure releasing mechanism can be performed remarkably gently.

For this reason, according to the present invention, a non-aqueous electrolytic solution secondary battery which has considerably high safety while maintaining high capacity and high power can be realized.

In the above aspects, when a Li/Mn composition ratio in the lithium-manganese complex oxide is set in a range of form 0.55 to 0.6, a non-aqueous electrolytic solution secondary battery which has a high level in an initial capacity and a capacity retaining percentage due to charging/discharging can be manufactured. At this time, in a case that amorphous carbon is used as the negative electrode active material, and the amount of elution of manganese of the lithium-manganese complex oxide into the non-aqueous electrolytic solution is set to 3.2% or less on the basis of the lithium-manganese complex oxide, even when the non-aqueous electrolytic solution secondary battery has fallen into the abnormal state, heat generation due to the chemical reaction between the non-aqueous electrolytic solution and the active material mixture can be suppressed to a low level, and safety and reliability of the non-aqueous electrolytic solution secondary battery can be improved more. From a viewpoint of material preparation and cost, it is preferable that lithium manganate among the lithium-manganese complex oxides is used as the positive electrode active material.

Moreover, lithium-manganese complex oxide where a half band width change of main diffraction light due to X-ray diffraction between SOC 0% and SOC 100% is set to 25% or less is used as the positive electrode active material, since a thermally stable structure can be obtained due that lowering of spinel crystallization in the lithium-manganese complex oxide is suppressed, manganese elution and oxygen discharge from the lithium-manganese complex oxide are suppressed at the abnormal time. Thus, by using such a specific lithium-manganese complex oxide as the positive electrode active material, the manganese elution and the oxygen discharge from the lithium-manganese complex oxide can be suppressed at the abnormal time, so that the amount of heat generation occurring according to decomposition reaction between manganese and oxygen can be decreased and the internal pressure can be released calmly from the internal pressure releasing mechanism. Accordingly, safety can be secured even at the abnormal time, and thereby the second object can be achieved.

At this time, when a Li/Mn composition ratio in the lithium-manganese complex oxide is set in a range of from 0.55 to 0.60, the amount of elution of manganese can be reduced more and heat generation is made difficult at the abnormal time as compared with a case of a stoichiometric composition (Li/Mn composition ratio=0.5), which results in preferable improvement in safety of the battery. Such a lithium-manganese complex oxide can include one where a portion of manganese thereof is substituted with another metal.

DETAILED DESCRIPTION OF THE PREFERRED EMBODIMENTS (First Embodiment)

A first embodiment where a non-aqueous electrolytic solution secondary battery according to the present invention is applied to a cylindrical lithium-ion secondary battery used as a power source or power supply for a hybrid electric vehicle will be explained below with reference to the drawing.

<Positive Electrode>

Figure 1:
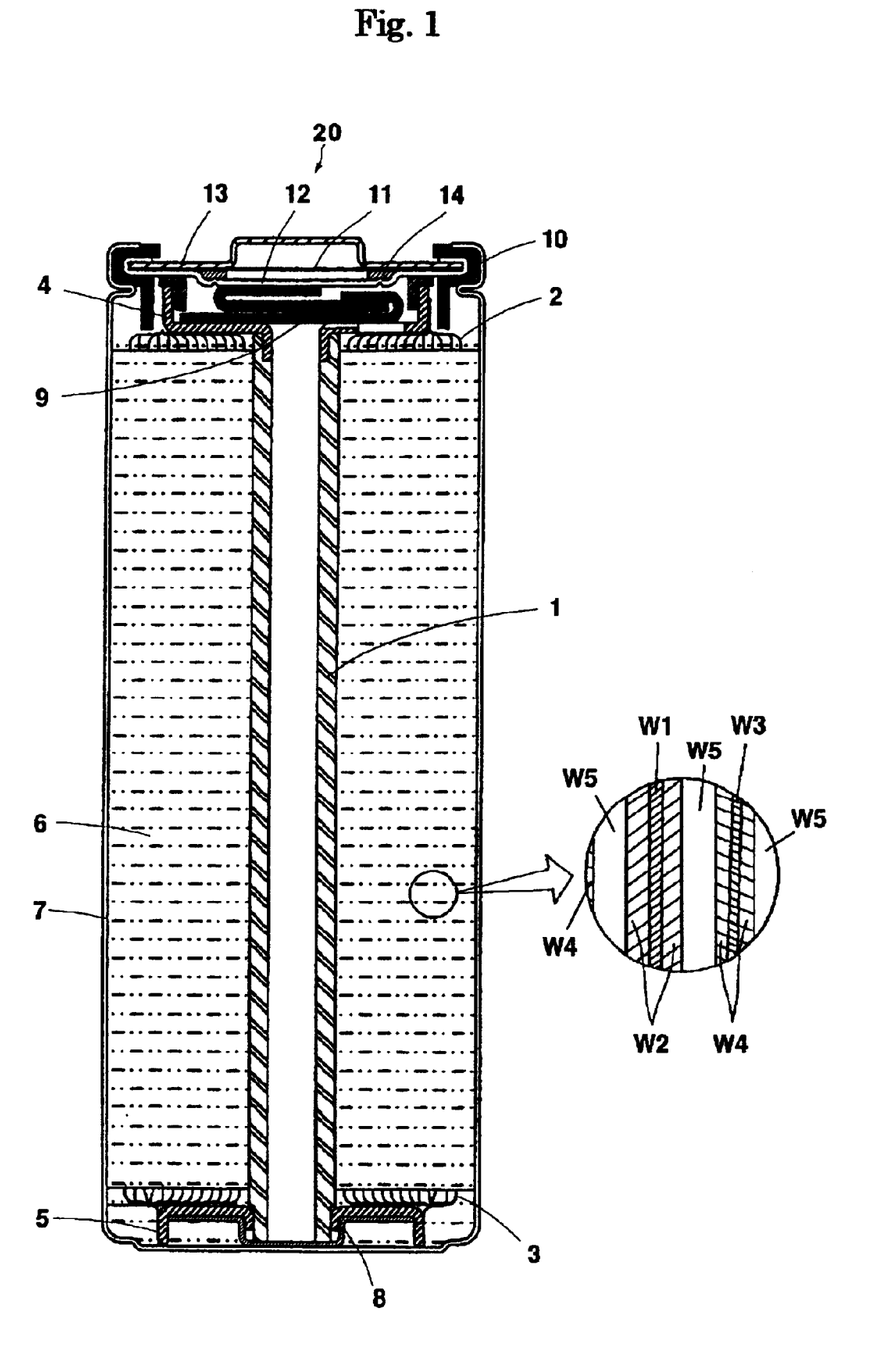
FIG. 1 is a sectional view of a cylindrical lithium-ion battery of a first embodiment to which the present invention can be applied.

As shown in FIG. 1, a powdered lithium manganate (LiMn$_2$O$_4$) serving as a positive electrode active material, graphite powder and acetylene black (AB) as conductive material, and polyvinylidene fluoride (PVDF) as a binder are mixed at a ratio of 83:10:2:5 by weight %, and the resultant mixture is added and mixed with N-methyl-2-pyrrolidone (NMP) as dispersion solvent to produce slurry. The slurry thus produce is applied to both surfaces of an aluminum foil W1 (positive electrode collector) having a thickness of 20 μm. At this time, a non-coated portion with a width of 30 mm is left on one side edge, in a longitudinal direction, of the positive electrode. Thereafter, the aluminum foil W1 thus applied with the mixture is dried, pressed and cut to produce a positive electrode having a width of 82 mm, a length of 342 cm and a predetermined thickness of the active material mixture layer W2 with a thickness of 109 μm applied thereon. The apparent density of the positive electrode active material mixture layer W2 is set to 2.65 g/cm$^3$. The non-coated portion is formed with notched portions, and the remaining portion thereof serves as positive electrode lead pieces 2. The distance or interval between adjacent positive electrode lead pieces 2 is set to 50 mm and the width of each positive electrode lead pieces 2 is set to 5 mm.

<Negative Electrode>

92 weight parts of a predetermined carbon powder is added with 8 weight parts of a polyvinylidene fluoride as a binder, and is further added and mixed with N-methyl-2-pyrrolidone (NMP) as dispersion solvent to produce slurry. The slurry thus produced is applied to both surfaces of a rolled copper foil W3 (negative electrode collector) having a thickness of 10 μm. At this time, a non-coated portion with a width of 30 mm is left on one side edge, in a longitudinal direction, of a negative electrode. Thereafter, the copper foil W3 thus applied with the mixture is dried, pressed and cut to produce the negative electrode having a width of 86 mm, a predetermined length and a predetermined thickness of the active material mixture applied portion W4. The negative electrode is compressed such that the porosity of the negative electrode active material mixture applied portion W4 is set to about 35%. The non-coated portion is formed with notched portions like the case of the positive electrode and the remaining portion thereof serves as negative electrode lead pieces 3. The distance or interval between adjacent negative electrode lead pieces 3 is set to 50 mm and the width of each negative electrode lead pieces 3 is set to 5 mm.

<Manufacture of Battery>

The positive electrode and the negative electrode thus manufactured are wound together with a separator W5 made of polyethylene and having a width of 90 mm and a thickness of 40 μm such that both the electrodes do not come in direct contact with each other. A hollow cylindrical rod core 1 made of polypropylene is used at a center of the winding. At this time, the positive electrode lead pieces 2 and negative electrode lead pieces 3 are respectively positioned at both end faces opposed to each other with respect to the winding group 6. Also, the lengths of the positive electrode, the negative electrode, and the separator are adjusted to set the diameter of the winding group 6 to 38±0.1 mm.

After all the positive electrode lead pieces 2 are deformed to be collected about and brought in contact with a peripheral face of a flange portion extended integrally from a periphery of a positive electrode collecting ring 4 positioned on an extension line of the rod core 1 of the winding group 6, the positive electrode lead pieces 2 and the peripheral face of the flange portion are welded to each other in a ultrasonic manner so that the positive electrode lead pieces 2 are connected to the peripheral face of the flange portion. Meanwhile, connecting operation between a negative electrode collecting ring 5 and the negative electrode lead pieces 3 is performed like the connecting operation between the positive electrode collecting ring 4 and the positive electrode lead pieces 2.

Thereafter, insulating covering or coating is applied on the entire peripheral surface of the flange portion of the positive electrode collecting ring 4. An adhesive tape comprising a base member made of polyimide and adhesive agent made of hexameta-acrylate and applied to one surface thereof is used for the insulating covering. This adhesive tape is wound at least one time from the peripheral surface of the flange portion to the outer peripheral surface of the winding group 6, thereby forming the insulating covering. The winding group 6 is inserted into a battery container 7 made of steel and nickel-plated. The outer diameter of the battery container 7 is 40 mm and the inner diameter thereof is 39 mm.

A negative electrode lead plate 8 for electric conduction is welded to the negative electrode collecting ring 5 in advance, and after insertion of the winding group 6 into the battery container 7, a bottom portion of the battery container 7 and the negative electrode lead plate 8 are welded to each other.

Meanwhile, one end of a positive electrode lead 9 configured by stacking a plurality of ribbons made of aluminum is welded to the positive electrode collecting ring 4 in advance, and the other end thereof is welded to a lower surface of a battery lid for sealing the battery container 7. The battery lid is provided with a cleavage valve 11 which cleaves according to an increase in battery internal pressure in the cylindrical lithium-ion battery 20 and which serves as an internal pressure releasing mechanism. The cleavage valve 11 is set to cleaving pressure of about 9×10$^5$Pa. The battery lid comprises a lid case 12, a lid cap 13, a valve retainer 14 for keeping air-tightness, and the cleavage valve 11, and the battery container is assembled by stacking these members to caulk a peripheral edge of the lid case 12.

Non-aqueous electrolytic solution is injected to the battery container 7 by a predetermined amount, the battery is then fitted to the battery container 7 in a folding manner of the positive electrode lead 9, and the battery container 7 is sealed by performing caulking via a gasket 10 made of EPD resin so that the cylindrical lithium-ion battery 20 is completed.

The non-aqueous electrolytic solution is prepared previously in the following manner: A lithium hexafluorophosphate (LiPF$_6$) is dissolved at 1 mole/liter into mixed solution of ethylene carbonate, dimethyl carbonate and diethyl carbonate at a volume ratio of 1:1:1. The cylindrical lithium-ion battery 20 is not provided with a current shutting-off or reducing mechanism, for example, such as a PTC (Positive Temperature Coefficient) element or the like, which operates according to an increase in battery temperature.

Now, in this embodiment, such a constitution is employed that a lithium manganate where an amount of elution of manganese into the non-aqueous electrolytic solution is 5% or less on the basis of the lithium manganate in a region in which an electrode potential to metal lithium is 4.8V or more is used as the positive electrode active material, and graphite in/from which lithium ions can be occluded/released according to charging/discharging is used as the negative electrode active material, or such a constituent is employed that the amount of elution of manganese into the non-aqueous electrolytic solution is 7% or less on the basis of the lithium manganate in the region is used as the positive electrode active material, and amorphous carbon in/from lithium ions can be occluded/released according to charging/discharging is used as the negative electrode active material.

In order to obtain a specific lithium manganate where an amount of elution of manganese into the non-aqueous electrolytic solution is on the above predetermined percentages or less on the basis of the lithium manganate in a region in which an electrode potential to metal lithium is 4.8V or more, various control factors such as limitation of the particle diameter (size) of material to be used, limitation of a specific surface area of the material, adjustment of composing materials for lithium manganate, control of composing conditions, and the like must be set. However, since the amount of elution of manganese varies due to complicated intertwinement of the above control factors and other factors to widen the dispersion of the amount of elution, it is difficult to set all factors by only one factor alone. In this embodiment, therefore, lithium manganates of several lots are prepared under various conditions, and a lot satisfying the above conditions is selected and used.

Also, the measurement of the amount of elusion of manganese from the lithium manganate was conducted in the following procedure. A portion of the positive electrode manufactured in the above manner is cut out, and it was maintained in a non-aqueous electrolytic solution at a potential of 4.8V or more for 24 hours or more, using metal lithium as a reference electrode. The manganese eluted into the non-aqueous electrolytic solution and manganese deposited on an opposing electrode were subjected to quantitative analysis and the total amount of the manganese was calculated on the basis of lithium manganate. Incidentally, in the measurement of the manganese elution amount, it is preferable that the potential of less than 6V is employed, because the non-aqueous electrolytic solution is decomposed when the potential is 6V or more.

Next, batteries of Examples of the cylindrical lithium-ion battery 20 manufactured according to the present embodiment will be explained below. Incidentally, batteries of Controls (Comparison examples) manufactured for making a comparison with the batteries of Examples will also be explained.

EXAMPLE 1

As shown in the following Table 1, in Example 1, a battery was manufactured by using lithium manganate (LiMn$_2$O$_4$) powder of Lot No. 1 as the positive electrode active material, using MCMB which was mesophase system spherical graphite as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 5.0%.

Incidentally, in the electrodes manufactured, the length of the negative electrode was set to be longer than that of the positive electrode by 12 cm such that, when wound, the positive electrode did not protrude at the innermost layer of the winding from the negative electrode in a winding direction and the positive electrode did not protrude at the outermost layer of the winding from the negative electrode in the winding direction. Also, the width of the negative electrode active material applied portion W4 was set to be longer than hat of the positive electrode active material applied portion W2 by 4 mm such that the positive electrode active material applied portion did not protrude from the negative electrode active material applied portion in a direction perpendicular to the winding direction (which is the same in the following Examples and Controls).

TABLE 1

POSITIVE ELECTRODE 22

| | LOT NO. | Li/Mn RATIO | ELUTION AMOUNT of Mn (%) | NEGATIVE ELECTRODE |
|---|---|---|---|---|
| Example 1 | 1 | 0.52 | 5.0 | Graphite (MCMB) |
| Example 2 | 2 | 0.52 | 3.3 | Graphite (MCMB) |
| Example 3 | 3 | 0.52 | 1.6 | Graphite (MCMB) |
| Example 4 | 4 | 0.52 | 2.1 | Graphite (MCMB) |
| Example 5 | 5 | 0.55 | 3.2 | Graphite (MCMB) |
| Example 6 | 6 | 0.58 | 3.1 | Graphite (MCMB) |
| Example 7 | 7 | 0.60 | 3.0 | Graphite (MCMB) |
| Example 8 | 8 | 0.61 | 3.0 | Graphite (MCMB) |
| Example 9 | 9 | 0.52 | 7.0 | Amorphous carbon |
| Example 10 | 10 | 0.52 | 5.0 | Amorphous carbon |
| Example 11 | 11 | 0.52 | 3.2 | Amorphous carbon |
| Example 12 | 12 | 0.52 | 1.4 | Amorphous carbon |
| Example 13 | 13 | 0.55 | 3.1 | Amorphous carbon |
| Example 14 | 14 | 0.58 | 3.2 | Amorphous carbon |
| Example 15 | 15 | 0.60 | 3.0 | Amorphous carbon |
| Example 16 | 16 | 0.61 | 3.1 | Amorphous carbon |
| Control 1 | 31 | 0.58 | 5.4 | Graphite (MCMB) |
| Control 2 | 32 | 0.58 | 6.1 | Graphite (MCMB) |
| Control 3 | 33 | 0.58 | 7.2 | Amorphous carbon |
| Control 4 | 34 | 0.58 | 9.6 | Amorphous carbon |

EXAMPLE 2

As shown in Table 1, in Example 2, a battery was manufactured by using lithium manganate powder of Lot No. 2 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 3.3%.

EXAMPLE 3

As shown in Table 1, in Example 3, a battery was manufactured by using lithium manganate powder of Lot No. 3 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 1.6%.

EXAMPLE 4

As shown in Table 1, in Example 4, a battery was manufactured by using lithium manganate powder of Lot No. 4 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 2.1%.

EXAMPLE 5

As shown in Table 1, in Example 5, a battery was manufactured by using lithium manganate powder of Lot No. 5 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.55 and the amount of elution of manganese was 3.2%.

EXAMPLE 6

As shown in Table 1, in Example 6, a battery was manufactured by using lithium manganate powder of Lot No. 6 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.58 and the amount of elution of manganese was 3.1%.

EXAMPLE 7

As shown in Table 1, in Example 7, a battery was manufactured by using lithium manganate powder of Lot No. 7 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.60 and the amount of elution of manganese was 3.0%.

EXAMPLE 8

As shown in Table 1, in Example 8, a battery was manufactured by using lithium manganate powder of Lot No. 8 as the positive electrode active material, using MCMB as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.61 and the amount of elution of manganese was 3.0%.

EXAMPLE 9

As shown in Table 1, in Example 9, a battery was manufactured by using lithium manganate powder of Lot No. 9 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 7.0%.

EXAMPLE 10

As shown in Table 1, in Example 10, a battery was manufactured by using lithium manganate powder of Lot No. 10 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 5.0%.

EXAMPLE 11

As shown in Table 1, in Example 11, a battery was manufactured by using lithium manganate powder of Lot No. 11 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 3.2%.

EXAMPLE 12

As shown in Table 1, in Example 12, a battery was manufactured by using lithium manganate powder of Lot No. 12 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.52 and the amount of elution of manganese was 1.4%.

EXAMPLE 13

As shown in Table 1, in Example 13, a battery was manufactured by using lithium manganate powder of Lot No. 13 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.55 and the amount of elution of manganese was 3.1%.

EXAMPLE 14

As shown in Table 1, in Example 14, a battery was manufactured by using lithium manganate powder of Lot No. 14 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.58 and the amount of elution of manganese was 3.2%.

EXAMPLE 15

As shown in Table 1, in Example 15, a battery was manufactured by using lithium manganate powder of Lot No. 15 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.60 and the amount of elution of manganese was 3.0%.

EXAMPLE 16

As shown in Table 1, in Example 16, a battery was manufactured by using lithium manganate powder of Lot No. 16 as the positive electrode active material, using amorphous carbon as the negative electrode active material, and setting the thickness (which does not include the thickness of the collector) of the negative electrode active material layer (active material applied portion) W4 to 79 μm, and setting the length of the negative electrode to 354 cm. The Li/Mn ratio of the positive electrode active material was 0.61 and the amount of elution of manganese was 3.1%.

(Control 1)

As shown in Table 1, in Control 1, a battery was manufactured by using lithium manganate ($LiMn_2O_4$) powder of Lot No. 31 as the positive electrode active material, using MCMB which was mesophase system spherical graphite as the negative electrode active material, and setting the thickness (which does not include the thickness of the collector) of the negative electrode active material layer (active material applied portion) to 79 μm, and setting the length of the negative electrode to 354 cm. The Li/Mn ratio of the positive electrode active material was 0.58 and the amount of elution of manganese was 5.4%.

(Control 2)

As shown in Table 1, in Control 2, a battery was manufactured by using lithium manganate powder of Lot No. 32 as the positive electrode active material, using MCMB as the negative electrode active material, and setting the thickness (which does not include the thickness of the collector) of the negative electrode active material layer (active material applied portion) to 79 μm, and setting the length of the negative electrode to 354 cm. The Li/Mn ratio of the positive electrode active material was 0.58 and the amount of elution of manganese was 6.1%.

(Control 3)

As shown in Table 1, in Control 3, a battery was manufactured by using lithium manganate powder of Lot No. 33 as the positive electrode active material, using amorphous carbon as the negative electrode active material, and setting the thickness (which does not include the thickness of the collector) of the negative electrode active material layer (active material applied portion) to 79 μm, and setting the length of the negative electrode to 354 cm. The Li/Mn ratio of the positive electrode active material was 0.58 and the amount of elution of manganese was 7.2%.

(Control 4)

As shown in Table 1, in Control 4, a battery was manufactured by using lithium manganate powder of Lot No. 34 as the positive electrode active material, using amorphous carbon as the negative electrode active material, and setting the thickness (which does not include the thickness of the collector) of the negative electrode active material layer (active material applied portion) to 79 μm, and setting the length of the negative electrode to 354 cm. The Li/Mn ratio of the positive electrode active material was 0.58 and the amount of elution of manganese was 9.6%.

[Test & Evaluation]

Next, regarding the respective batteries of the Examples and the Controls manufactured in the above manner, a series of tests were conducted in the following manner.

After each of the respective batteries of the Examples and Controls was charged, it was discharged so that its discharging capacity was measured. The charging conditions were set on a constant voltage of 4.2V, a limiting current of 5 A, and a charging time of 3.5 hours. The discharging conditions were set on a constant current of 5 A and a final voltage of 2.7V.

Also, the discharging power of each battery which was put in a charged state was measured under the above conditions. The measuring conditions were as follows: Each voltage of the fifth second at each discharging current of 1 A, 3 A and 6 A was read and plotted on the vertical axis to the current value of the horizontal axis, where a straight line in which an approximate collinear was performed by three points reached a final voltage 2.7V, the product of the current value by the 2.7V was calculated as an initial power for each battery.

Further, after each battery was repeated 100 cycles of charging and discharging on the above conditions, the capacity thereof was measured. A percentage of the power of the 100th cycle to the initial power (hereinafter, called "power retaining percentage") was calculated. It goes without saying that, the higher the power retaining percentage is, the more excellent the life characteristic is.

The measurements of the charging, discharging, and power were conducted in the atmosphere of an environmental temperature of 25±1° C.

Thereafter, each battery manufactured was continuously charged at the room temperature with a constant current of 20 A, and its behavior was observed. The test results are shown in the following Table 2. Such a phenomenon of gas discharging constituted with volatile material of electrolytic solution occurred after the cleavage valve was cleaved. In order to compare the magnitudes of the respective gas dischargings of the batteries with one another, the temperatures of battery surfaces just after the phenomena occurred in the batteries were measured. Also, presence/absence of deformation in each battery container was observed. Incidentally, in Table 2, a circle mark indicates a battery whose battery container was not deformed at all, a delta mark indicates a battery whose battery container was slightly deformed, and a mark "X" indicates a battery whose battery container was largely deformed.

TABLE 2

| | CAPACITY | | | SAFETY | |
| --- | --- | --- | --- | --- | --- |
| | INITIAL (Ah) | POWER RETAINING (%) | POWER (W) | BATTERY SURFACE (° C.) | BATTERY APPEARANCE |
| Example 1 | 6.4 | 90 | 800 | 190 | Δ |
| Example 2 | 6.4 | 90 | 790 | 170 | ○ |
| Example 3 | 6.3 | 90 | 790 | 130 | ○ |
| Example 4 | 6.3 | 90 | 800 | 160 | ○ |
| Example 5 | 6.3 | 95 | 780 | 170 | ○ |
| Example 6 | 6.2 | 96 | 780 | 170 | ○ |
| Example 7 | 6.2 | 96 | 780 | 160 | ○ |
| Example 8 | 5.1 | 96 | 780 | 160 | ○ |
| Example 9 | 6.2 | 91 | 820 | 170 | ○ |

TABLE 2-continued

|  | CAPACITY | | | SAFETY | |
| --- | --- | --- | --- | --- | --- |
|  | INITIAL (Ah) | POWER RETAINING (%) | POWER (W) | BATTERY SURFACE (° C.) | BATTERY APPEARANCE |
| Example 10 | 6.2 | 91 | 810 | 150 | ◯ |
| Example 11 | 6.1 | 91 | 810 | 110 | ◯ |
| Example 12 | 6.0 | 91 | 810 | 90 | ◯ |
| Example 13 | 6.1 | 96 | 800 | 90 | ◯ |
| Example 14 | 6.1 | 97 | 800 | 90 | ◯ |
| Example 15 | 6.0 | 97 | 800 | 90 | ◯ |
| Example 16 | 4.9 | 97 | 800 | 90 | ◯ |
| Control 1 | 6.4 | 90 | 790 | 280 | X |
| Control 2 | 6.4 | 90 | 780 | 310 | X |
| Control 3 | 6.2 | 90 | 820 | 270 | X |
| Control 4 | 6.2 | 90 | 820 | 320 | X |

As shown in Table 2, in each battery of Examples 1 to 16, high capacity and high power were obtained, and battery behavior during continuous charging was calm. The surface temperature of each battery was in a range of 90° C. to 190° C. In each of batteries of Controls 1 and 2 where graphite was used as the negative electrode and the amount of elution of manganese from the lithium manganate serving as the positive electrode active material was above 5% and each of batteries of Controls 3 and 4 where amorphous carbon was used as the negative electrode and the amount of elution of manganese from the lithium manganate serving as the positive electrode active material was above 7%, high capacity and high power was achieved, but its behavior during continuous charging became violent together with deformation of the battery, and the surface temperature of the battery exceeded 200° C. largely.

In each battery of Examples 5 to 7 and 13 to 15 where the Li/Mn ratio in the lithium manganate was 0.55 or more, the capacity retaining percentage was remarkably high. In each battery of Examples 8 and 16 where the Li/Mn ratio was above 0.60, a remarkable capacity reduction was caused. Therefore, it was found that the Li/Mn ratio was preferably in the range of from 0.55 to 0.60.

In each battery of Examples 9 to 16 where amorphous carbon was used as the negative electrode among the above batteries, such results were obtained that the power and the discharging capacity retaining percentage of the battery were high and the surface temperature thereof was low. Accordingly, each battery of the Examples 9 to 16 was one which has high capacity, high power and excellent safety and which was well balanced generally. Particularly, each battery of Examples 13 to 15 where amorphous carbon was used as the negative electrode active material, the Li/Mn ratio was in the range of from 0.55 to 0.60, and the amount of elution of manganese was 3.2% or less was a safer battery where the surface temperature of the battery during continuous charging was the lowermost temperature of 90° C.

As mentioned above, the cylindrical lithium-ion battery 20 of the present embodiment is a battery whose behavior is remarkably calm even when it is put in an abnormal state and which is excellent in safety. Thus, a battery having high capacity, high power and remarkably high safety is particularly suitable for a power source for an electric vehicle.

(Second Embodiment)

Next, a second embodiment where a non-aqueous electrolytic solution secondary battery according to the present invention is applied to a cylindrical lithium-ion battery used as a power source for an electric vehicle will be explained below. In this embodiment, for the State of Charge (hereinafter, called SOC) of the cylindrical lithium-ion battery is defined as a discharged state (2.7V) being 0% and a fully charged state (4.2V) being 100%. Incidentally, in this embodiment, differences from the first embodiment are only the positive electrode and the negative electrode, and the manufacture of the battery is the same as that in the first embodiment. Therefore, the same parts or members as those in the first embodiment will be attached with the same reference numerals as those therein, and explanations thereof will be omitted. The different parts or members will be explained below.

<Positive Electrode>

100 weight parts of lithium manganate serving as a positive electrode active material is added with 10 weight parts of scale-shaped graphite serving as a conductive agent and 10 weight parts of polyvinylidene fluoride (PVDF) as a binder, and the resultant mixture is added and mixed with N-methyl-2-pyrrolidone (NMP) as dispersion solvent to produce a positive electrode mixture (slurry). The slurry thus produced is applied to both surfaces of an aluminum foil of a metal collector having a thickness of 20 μm. Then, the aluminum foil is dried, pressed and cut to produce a positive electrode having a positive electrode active material applied portion with a thickness of 90 μm (which does not include the thickness of the aluminum foil).

As the lithium manganate, one which was expressed by a chemical formula of $Li_{1+x}Mn_{2-x}O_4$ or $Li_{1+x}M_yMn_{2-x-y}O_4$ (M is a metal element which was substituted for Mn), where a Li/Mn composition ratio (hereinafter, called "Li/Mn ratio") was in a range of from 0.50 to 0.60 and a half band width change of main diffraction light due to X-ray diffraction between SOC 0% and SOC 100% was set to 25% or less was used. An apparatus for measuring the half band width was a X-ray diffraction apparatus model No. RINT1100K (equipped with an automatic data processing system) manufactured by Rigaku Corporation. Incidentally, the lithium manganate can be composed or produced by mixing, sintering suitable lithium salt and manganese oxide, and a desired Li/Mn ratio can be achieved by controlling preparation ratio of lithium salt and manganese oxide or the like.

<Negative Electrode>

100 weight parts of amorphous carbon powder serving as a negative electrode active material is added with 10 weight parts of PVDF as a binder, and the resultant mixture is added and mixed with N-methyl-2-pyrrolidone as dispersion solvent to produce a negative electrode mixture (slurry). The slurry thus produced is applied to both surfaces of a rolled copper foil having a thickness of 10 μm. Then, the copper foil is dried, pressed and cut to produce a negative electrode having a negative electrode active material applied portion with a thickness of 70 μm (which does not include the thickness of the rolled copper foil).

Next, batteries of Examples of the cylindrical lithium-ion battery manufactured according to the present embodiment will be explained below. Incidentally, batteries of Controls manufactured for making a comparison with the batteries of Examples will also be explained.

EXAMPLE 17

As shown in the following Table 3, in Example 17, a battery was manufactured by using lithium manganate ($Li_{1.06}Mn_{1.94}O_4$) where the half band width change (hereinafter, referred to as "half width change" simply in this embodiment)of main diffraction light due to X-ray diffraction between SOC 0% and SOC 100% was 6%, and the Li/Mn ratio was 0.55 as the positive electrode active material.

TABLE 3

| | POSITIVE ELECTRODE ACTIVE MATERIAL | | |
| --- | --- | --- | --- |
| | COMPOSITION | Li/Mn RATIO | HALF BAND WIDTH CHANGE (%) |
| Example 17 | $Li_{1.06}Mn_{1.94}O_4$ | 0.55 | 6 |
| Example 18 | $Li_{1.06}Mn_{1.94}O_4$ | 0.55 | 10 |
| Example 19 | $Li_{1.06}Mn_{1.94}O_4$ | 0.55 | 18 |
| Example 20 | $Li_{1.14}Mn_{1.86}O_4$ | 0.60 | 25 |
| Example 21 | $Li_{1.09}Al_{0.095}Mn_{1.805}O_4$ | 0.60 | 25 |
| Example 22 | $LiMn_2O_4$ | 0.50 | 10 |
| Control 5 | $Li_{1.06}Mn_{1.94}O_4$ | 0.55 | 30 |
| Control 6 | $Li_{1.06}Mn_{1.94}O_4$ | 0.55 | 40 |
| Control 7 | $Li_{1.14}Mn_{1.86}O_4$ | 0.60 | 32 |
| Control 8 | $Li_{1.09}Al_{0.095}Mn_{1.805}O_4$ | 0.60 | 30 |

EXAMPLES 18 AND 19

As shown in Table 3, in Examples 18 and 19, each battery was manufactured in the same manner as the Example 17 except that the lithium manganate where the half width change was 10% or 18% was used as the positive electrode active material.

EXAMPLE 20

As shown in Table 3, in Example 20, a battery was manufactured in the same manner as the Example 17 except that lithium manganate ($Li_{1.14}Mn_{1.86}O_4$) where the half width change was 25% and the Li/Mn ratio was 0.60 was used as the positive electrode active material.

EXAMPLE 21

As shown in Table 3, in Example 21, a battery was manufactured in the same manner as the Example 17 except that lithium manganate ($Li_{1.09}Al_{0.095}Mn_{1.805}O_4$) where the half width change was 25%, the Li/Mn ratio was 0.60, and Al was substituted for a portion of Mn was used as the positive electrode active material.

EXAMPLE 22

As shown in Table 3, in Example 22, a battery was manufactured in the same manner as the Example 17 except that lithium manganate ($LiMn_2O_4$) where the half width change was 10% and the Li/Mn ratio was 0.50 was used as the positive electrode active material.

(Controls 5 and 6)

As shown in Table 3, in Controls 5 and 6, each battery was manufactured in the same manner as the Example 17 except that the lithium manganate ($Li_{1.06}Mn_{1.94}O_4$) where the half width change was 30% or 40% was used as the positive electrode active material.

(Control 7)

As shown in Table 3, in Control 7, a battery was manufactured in the same manner as the Example 17 except that the lithium manganate ($Li_{1.14}Mn_{1.86}O_4$) where the half width change was 32% and the Li/Mn ratio was 0.60 was used as the positive electrode active material.

(Control 8)

As shown in Table 3, in Control 8, a battery was manufactured in the same manner as the Example 17 except that lithium manganate ($Li_{1.09}Al_{0.095}Mn_{1.805}O_4$) where the half width change was 30%, the Li/Mn ratio was 0.60, and Al was substituted for a portion of Mn was used as the positive electrode active material.

(Test)

Next, after each battery of the Examples and the Controls manufactured in the above manner was subjected to an initial charging/discharging test, an overcharging test which continuously charges a constant current of 10 A to the battery of SOC 100% at an ambient temperature of 25° C. was performed. Then, the maximum reached temperature of the surface of each battery after it has fallen into an abnormal state was measured and the appearance thereof was observed. Each battery which is subjected to the overcharging test becomes an abnormal state by the overcharging and the surface temperature of the battery increases due to heat generation. According to this phenomenon, the internal pressure inside the battery increases and the cleavage valve 11 cleaves so that gas inside the battery is discharged outside. The test results are shown in the following Table 4.

TABLE 4

| | OVERCHARGING TEST RESULTS | |
| --- | --- | --- |
| | BATTERY SURFACE TEMPERATURE (° C.) | WHITE SMOKE |
| Example 17 | 120 | little |
| Example 18 | 125 | little |
| Example 19 | 140 | little |
| Example 20 | 130 | little |
| Example 21 | 150 | little |
| Example 22 | 200 | little |
| Control 5 | 380 | much |
| Control 6 | 400 | much |
| Control 7 | 390 | much |
| Control 8 | 410 | much |

As shown in Tables 3 and 4, in each battery of the Examples 17 to 19 using the lithium manganate where the half width change was 25% or less and the Li/Mn ratio was 0.55, the maximum reached temperature of the surface thereof when it fell into the abnormal state was 140° C. or less, and the amount of white smoke generated was small. Namely, each battery was a battery which was calm and had excellent safety. On the contrary, in each battery of the Controls 5 and 6 using the lithium manganate where the half width change exceeded 25% and the Li/Mn ratio was 0.55, the maximum reached temperature of the surface thereof when it fell into the abnormal state was elevated up to about 400° C., and a large amount of white smoke was jetted violently.

Also, in a battery of the Example 20 using the lithium manganate where the half width change was 25% and the Li/Mn ratio was 0.60, the maximum reached temperature of the surface thereof when it fell into the abnormal state was 130° C., an amount of white smoke was small, and accordingly safety thereof was excellent. However, in a battery of the Control 7 using the lithium manganate where the half width change was 32% and the Li/Mn ratio was 0.60, the maximum reached temperature of the surface thereof reached 390° C. and a large amount of white smoke was jetted violently.

Moreover, even when the lithium manganate ($Li_{1.09}Al_{0.095}Mn_{1.805}O_4$) where the Li/Mn was 0.60 and Al was substituted for a portion of Mn was used as the positive electrode active material, in a battery of Example 21 where the half width change was 25%, the maximum reached temperature of the surface thereof was 150° C. and an amount of white smoke was small, and accordingly excellent safety was achieved. On the contrary, in a battery of Control 8 where the half width change was 30%, the maximum reached temperature of the surface thereof reached 410° C. and white smoke was jetted violently.

On the other hand, in a battery of Example 22 using the lithium manganate where the half width change was 10% and the Li/Mn ratio was 0.50 as the positive electrode active material, the amount of white smoke generated was small and excellent safety was achieved, but the maximum reached temperature of the surface of the battery reached 200° C. which was relatively high.

From the above test results, it has been found in each battery of the Examples 17 to 22 of the present invention using the lithium manganate where the half width change was 25% or less as the positive electrode active material that the maximum reached temperature of the battery at the abnormal time can be suppressed to low temperature, an amount of white smoke can be reduced. Therefore, such a battery can be secured safely even if it falls into the abnormal state. Also, it has been found that, in order to further suppress the maximum reached temperature of the battery at the abnormal time, it is preferable to set the Li/Mn ratio in the lithium manganate used as the positive electrode active material in the range of from 0.55 to 0.60.

Incidentally, in the above embodiments, the large-sized secondary batteries used for a power source for an electric vehicle have been illustrated, but the present invention is not limited to the sizes of the batteries and the battery capacities described in these embodiments. It has been confirmed that the present invention exhibits a significant effect in a battery whose battery capacity is about 3 to 10 Ah. Also, in the above embodiments, the cylindrical batteries have been illustrated, but the present invention is not limited to any specific shape. For example, the present invention is applicable to a shape with a rectangular sectional configuration or any polygonal shape. Furthermore, as a structure to which the present invention is applicable, any structure other than the structure where the battery lid is fitted to the above cylindrical container (can) in a sealing manner through caulking can be employed. As one example of such a structure, a battery where positive and negative external terminals which penetrate battery lids and these external terminals push with each other via a rod core can be listed.

Also, in the above embodiments, the example where, as the insulating covering or coating, the adhesive tape comprising the base material of polyimide and the adhesive agent of hexametha-acrylate applied to one side surface thereof was used was illustrated. However, this invention is not limited to this adhesive tape. For example, an adhesive tape comprising a base material of polyolefin such as polypropylene, polyethylene or the like, and acrylic system adhesive agent such as hexametha-acrylate, butyl-acrylate or the like applied to one side surface or both side surfaces of the base material, or tape without applying adhesive agent thereon and comprising polyolefin or polyimide or the like can also be used preferably.

Moreover, in the above embodiments, the lithium manganate was used for the positive electrode for the lithium-ion battery, amorphous carbon was used for the negative electrode, the solution prepared by dissolving lithium hexafluorophosphate at 1 mole/liter into the mixed solution of ethylene carbonate, dimethyl carbonate and diethyl carbonate at the volume ratio of 1:1:1 was used as the electrolytic solution. However, the present invention is not limited to these materials and solution. Also, as the conductive material and the binder, ones which are used ordinarily can be used in this invention. In general, the lithium manganate can be composed by mixing and sintering suitable lithium salt and manganese oxide, and the desired Li/Mn ratio can be achieved by controlling preparation ratio of lithium salt and manganese oxide.

Also, as binders other than the above-mentioned embodiments which can be used, there are polymers such as Teflon, polyethylene, polystyrene, polybutadiene, isobutylene-isopren rubber, nitrile rubber, styrene-butadiene rubber, polysulfide rubber, cellulose nitrate, cyanoethyl cellulose, polyvinyl alcohol, various latex, acrylonitrile, vinyl fluoride, vinylidene fluoride, propylene fluoride, chloroprene fluoride and the like, and mixture thereof.

Furthermore, as positive electrode active materials for a lithium-ion battery other than the above-mentioned embodiments which can be used, it is preferable to use lithium-manganese complex oxide in/from lithium ions can be occluded/released and a sufficient amount of lithium has been occluded in advance. A lithium manganate having a spinel structure or a material where a portion of manganese or lithium has been substituted or doped with another metal can be used as the active material. Further, in the second embodiment, the lithium manganate where Al has been substituted for a portion of Mn was illustrated, but lithium manganate where another metal element (for example, Co, Ni, Fe, Cu, Cr, Mg, Zn, V, Ga, B, F and the like) has been substituted for a portion of Mn may be used.

Also, regarding negative electrode active materials for a lithium-ion battery other than the above embodiments which can be used, there is not any limitation except for the scope of the invention as hereinafter claimed. For example, as the material, natural graphite, various artificial graphite materials, cokes, amorphous carbon or the like can also be used. The particle shapes of these materials may include scale shape, sphere shape, fiber shape, massive shape, and the like, but the active material used in this invention is not limited to the specific shape illustrated in the embodiments. In the case of using the amorphous carbon as the negative electrode active material, it can exhibit an excellent flexibility and the negative electrode active material layer can be prevented from being peeled off and released from the negative electrode when the electrode winding group is formed by winding the respective members spirally.

Also, as the non-aqueous electrolytic solution, an electrolytic solution prepared by using an ordinary lithium salt as an electrolyte to dissolve the lithium salt in an organic solvent can be used, where a lithium salt and organic solvent to be used are not limited to specific materials. For example, as the electrolyte, $LiClO_4$, $LiAsF_6$, $LiPF_6$, $LiBF_4$, $LiB(C_6H_5)_4$, $CH_3SO_3Li$, $CF_3SO_3Li$ or the like, or mixture thereof can be used. As the non-aqueous electrolytic solution organic solvent, polypropylene carbonate, ethylene carbonate, 1,2-dimethxy ethane, 1,2-diethxy ethane, γ-butyrolactone, tetrahydofuran, 1,3-dioxolane, 4-methyl-1, 3-dioxolane, diethyl ether, sulfolane, methyl-sulfolane, acetonitrile, propionitrile, or the like, or mixed solvent of at least two kinds thereof can be used, and the composition ratio of mixture is not limited to any specific range.

What is claimed is:

1. A non-aqueous electrolytic solution secondary battery where an electrode group having a positive electrode, a negative electrode and a separator, connecting portions which connect to respective terminals from the electrode group, and a non-aqueous electrolytic solution are accommodated in a battery container provided with an internal pressure releasing mechanism which releases internal pressure at a predetermined pressure and where the positive electrode is constituted by applying a positive electrode active material mixture including lithium-manganese complex oxide and conductive material on both surfaces of a foil-shaped positive electrode collector, and the negative electrode is constituted by applying a negative electrode active material mixture including carbon material on both surfaces of a foil-shaped negative electrode collector, wherein the lithium-manganese complex oxide is set such that an amount of elution of manganese into the non-aqueous electrolytic solution is 5% or less on the basis of the lithium-manganese complex oxide in a range where an electrode potential to metal lithium is 4.8V or more, and the carbon material is graphite in/from which lithium ions can be occluded/released according to charging/discharging.

2. A non-aqueous electrolytic solution secondary battery according to claim 1, wherein a Li/Mn composition ratio in the lithium-manganese complex oxide is in a range of from 0.55 to 0.60.

3. A non-aqueous electrolytic solution secondary battery according to claim 2, wherein the carbon material is graphite, and the amount of elution of manganese of the lithium-manganese complex oxide into the non-aqueous electrolytic solution is 3.2% or less on the basis of the lithium-manganese complex oxide.

4. A non-aqueous electrolytic solution secondary battery according to claim 1, wherein the lithium-manganese complex oxide is lithium manganate.

5. A non-aqueous electrolytic solution secondary battery according to claim 1, wherein the lithium-manganese complex oxide is selected such that a half band width change of main diffraction light due to X-ray diffraction between SOC 0% and SOC 100% is 25% or less.

6. A non-aqueous electrolytic solution secondary battery according to claim 5, wherein a Li/Mn composition ratio of the lithium-manganese complex oxide is in a range of from 0.55 to 0.60.

7. A non-aqueous electrolytic solution secondary battery according to claim 5, wherein the lithium-manganese complex oxide is prepared by substituting a metal element for a portion of manganese.

8. A non-aqueous electrolytic solution secondary battery according to claim 5, wherein the lithium-manganese complex oxide has a spinel crystallization structure.

9. A non-aqueous electrolytic solution secondary battery according to claim 5, wherein the lithium-manganese complex oxide is expressed by a chemical formula $Li_{1+x}Mn_{2-x}O_4$.

10. A non-aqueous electrolytic solution secondary battery according to claim 5, wherein the lithium-manganese complex oxide is expressed by a chemical formula $Li_{1+x}M_yMn_{2-x-y}O_4$.

11. A non-aqueous electrolytic solution secondary battery where an electrode group having a positive electrode, a negative electrode and a separator, connecting portions which connect to respective terminals from the electrode group, and a non-aqueous electrolytic solution are accommodated in a battery container provided with an internal pressure releasing mechanism which releases internal pressure at a predetermined pressure and where the positive electrode is constituted by applying a positive electrode active material mixture including lithium-manganese complex oxide and conductive material on both surfaces of a foil-shaped positive electrode collector, and the negative electrode is constituted by applying a negative electrode active material mixture including carbon material on both surfaces of a foil-shaped negative electrode collector, wherein the lithium-manganese complex oxide is set such that an amount of elution of manganese into the non-aqueous electrolytic solution is 7% or less on the basis of the lithium-manganese complex oxide in a range where an electrode potential to metal lithium is 4.8V or more, and the carbon material is amorphous carbon in/from which lithium ions can be occluded/released according to charging/discharging.

12. A non-aqueous electrolytic solution secondary battery according to claim 11, wherein a Li/Mn composition ratio in the lithium-manganese complex oxide is in a range of from 0.55 to 0.60.

13. A non-aqueous electrolytic solution secondary battery according to claim 12, wherein the carbon material is amorphous carbon, and the amount of elution of manganese of the lithium-manganese complex oxide into the non-aqueous electrolytic solution is 3.2% or less on the basis of the lithium-manganese complex oxide.

14. A non-aqueous electrolytic solution secondary battery according to claim 11, wherein the lithium-manganese complex oxide is lithium manganate.

15. A non-aqueous electrolytic solution secondary battery according to claim 11, wherein the lithium-manganese complex oxide is selected such that a half band width change of main diffraction light due to X-ray diffraction between SOC 0% and SOC 100% is 25% or less.

16. A non-aqueous electrolytic solution secondary battery according to claim 15, wherein a Li/Mn composition ratio of the lithium-manganese complex oxide is in a range of from 0.55 to 0.60.

17. A non-aqueous electrolytic solution secondary battery according to claim 15, wherein the lithium-manganese complex oxide is prepared by substituting a metal element for a portion of manganese.

18. A non-aqueous electrolytic solution secondary battery according to claim 15, wherein the lithium-manganese complex oxide has a spinel crystallization structure.

19. A non-aqueous electrolytic solution secondary battery according to claim 15, wherein the lithium-manganese complex oxide is expressed by a chemical formula $Li_{1+x}Mn_{2-x}O_4$.

20. A non-aqueous electrolytic solution secondary battery according to claim 15, wherein the lithium-manganese complex oxide is expressed by a chemical formula $Li_{1+x}M_yMn_{2-x-y}O_4$.

* * * * *